Aug. 23, 1938.     S. HEATH     2,127,687
PROPELLER
Filed April 23, 1930      6 Sheets-Sheet 1
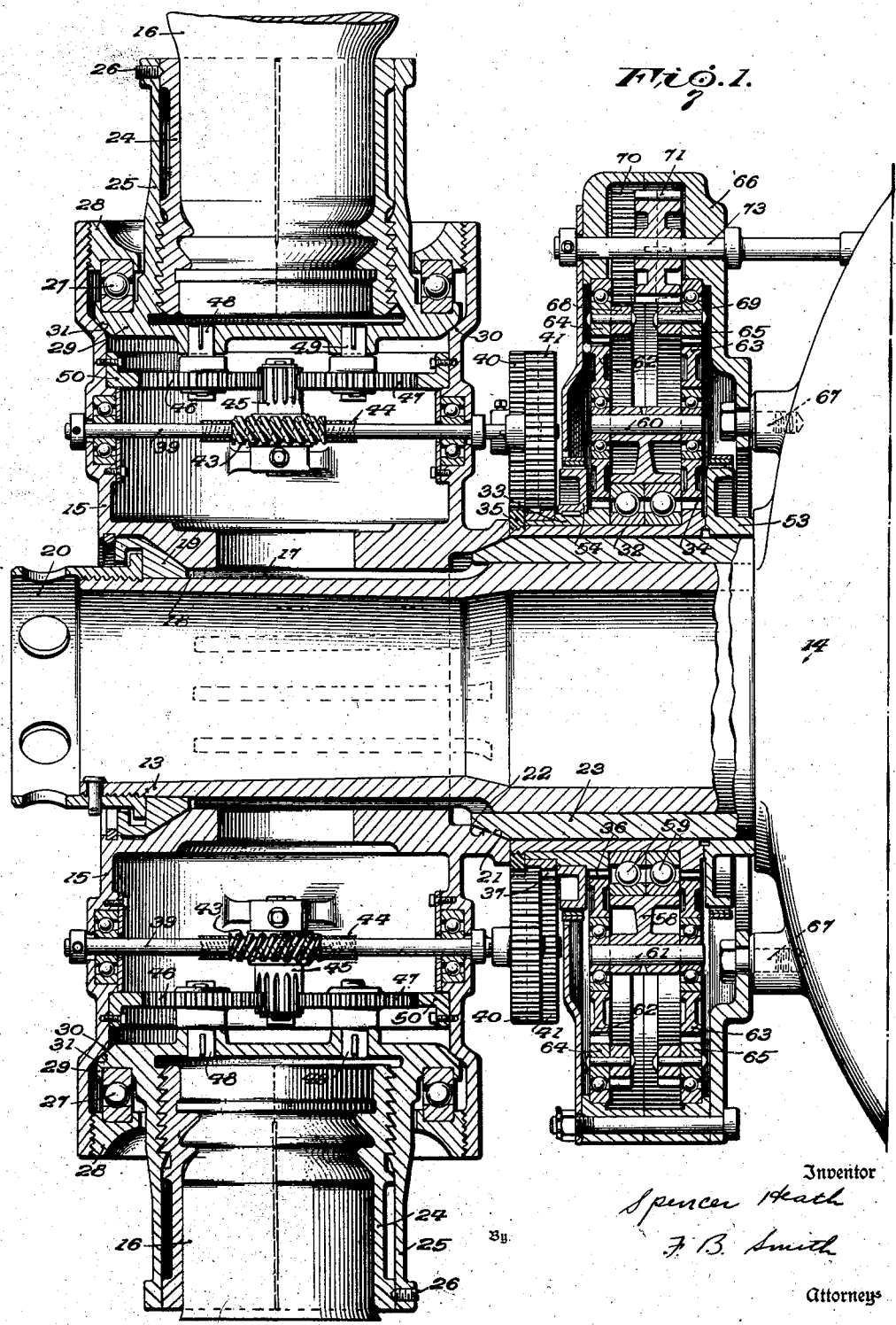
Inventor
Spencer Heath
F. B. Smith
Attorneys

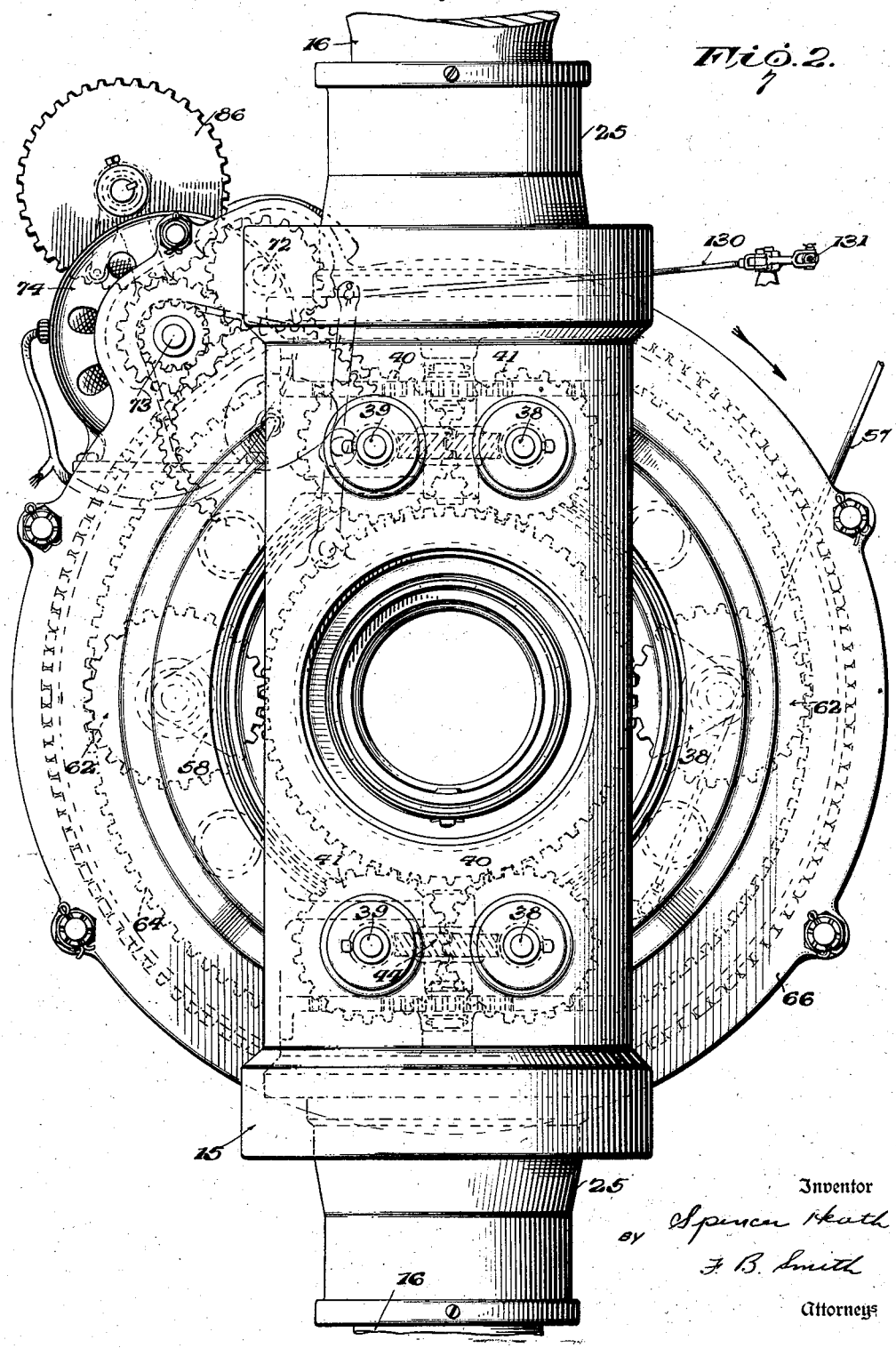

Aug. 23, 1938.   S. HEATH   2,127,687
PROPELLER
Filed April 23, 1930   6 Sheets-Sheet 3
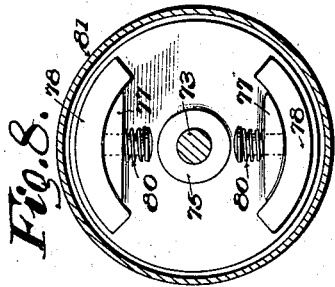
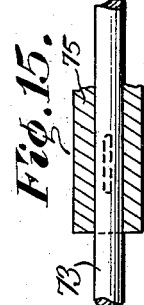
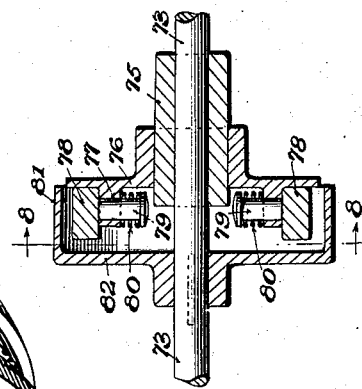
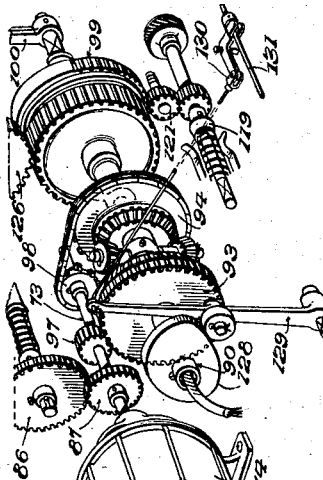
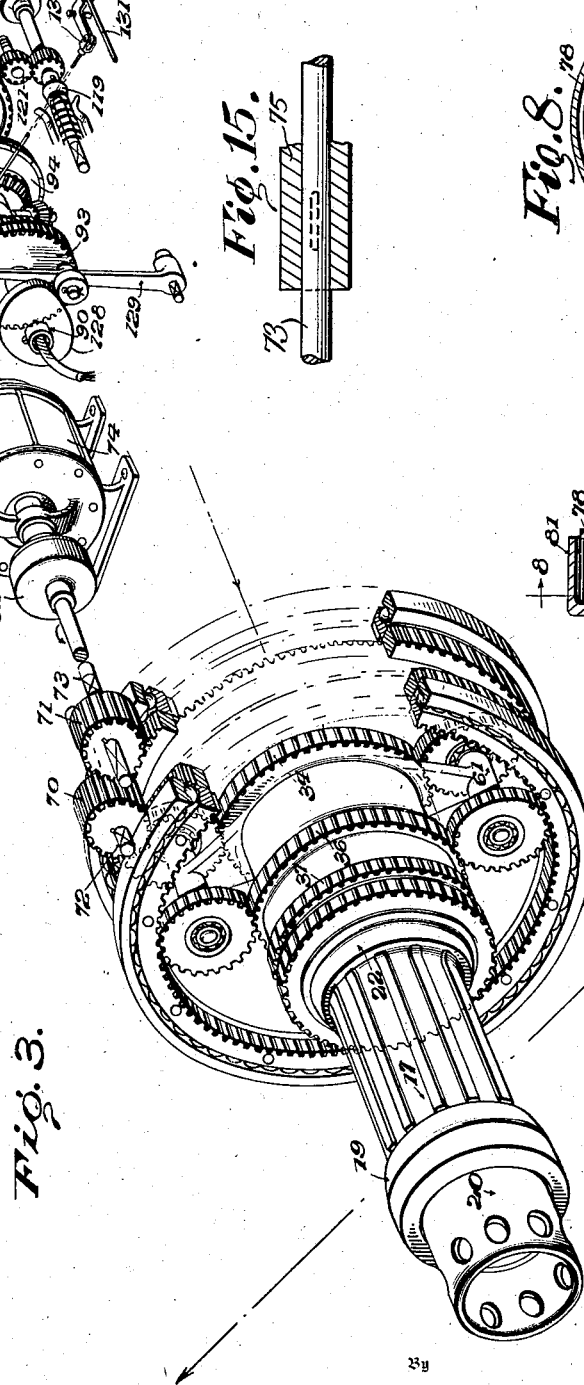
Inventor
Spencer Heath
F. B. Smith
Attorneys

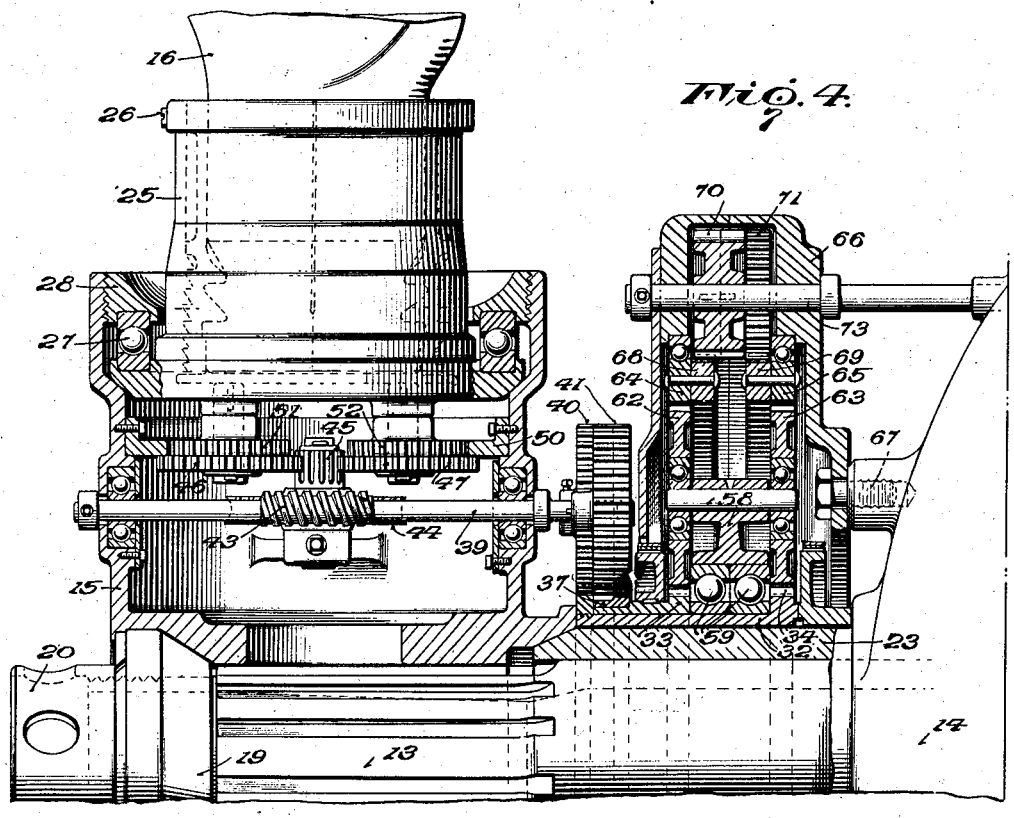
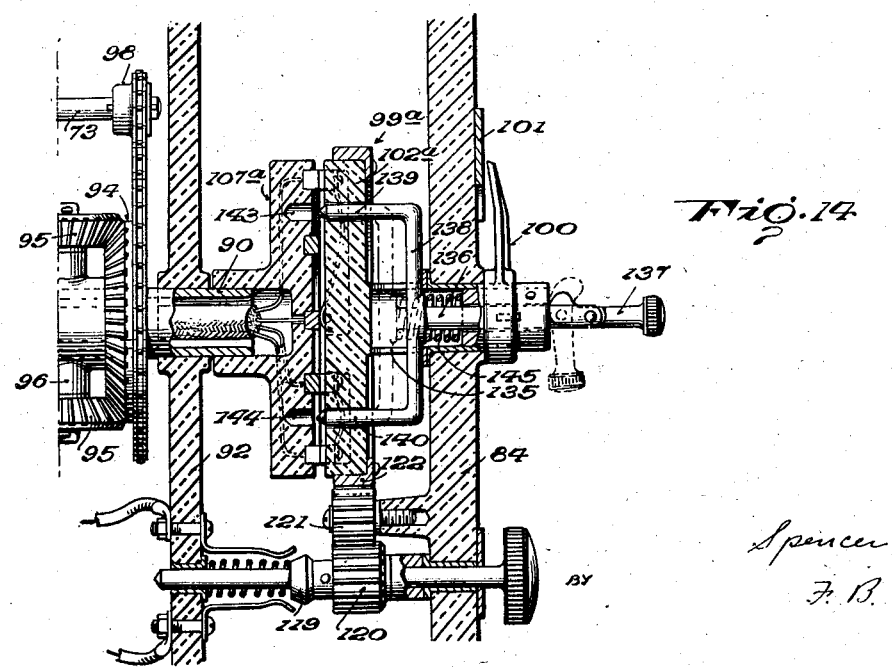

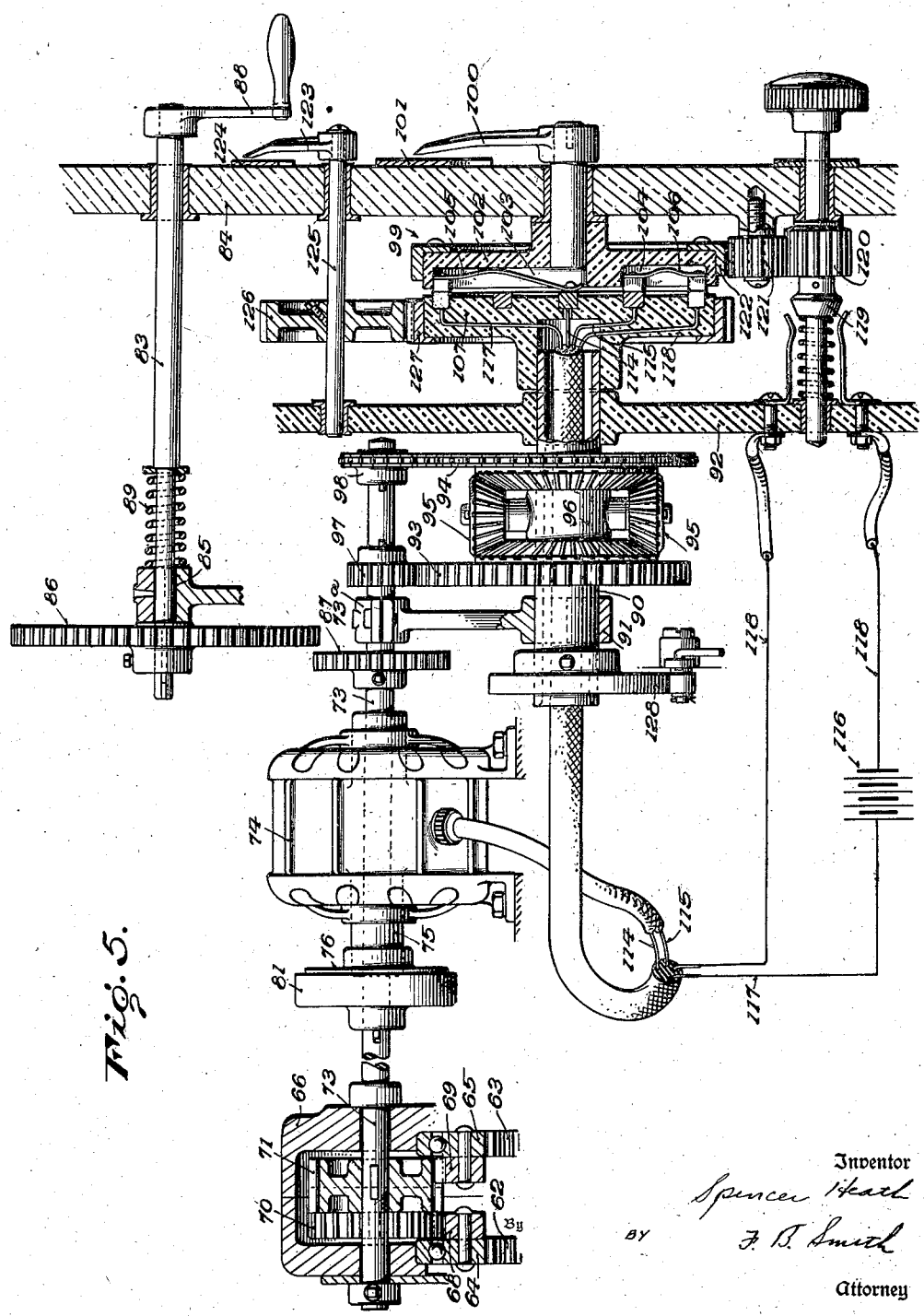

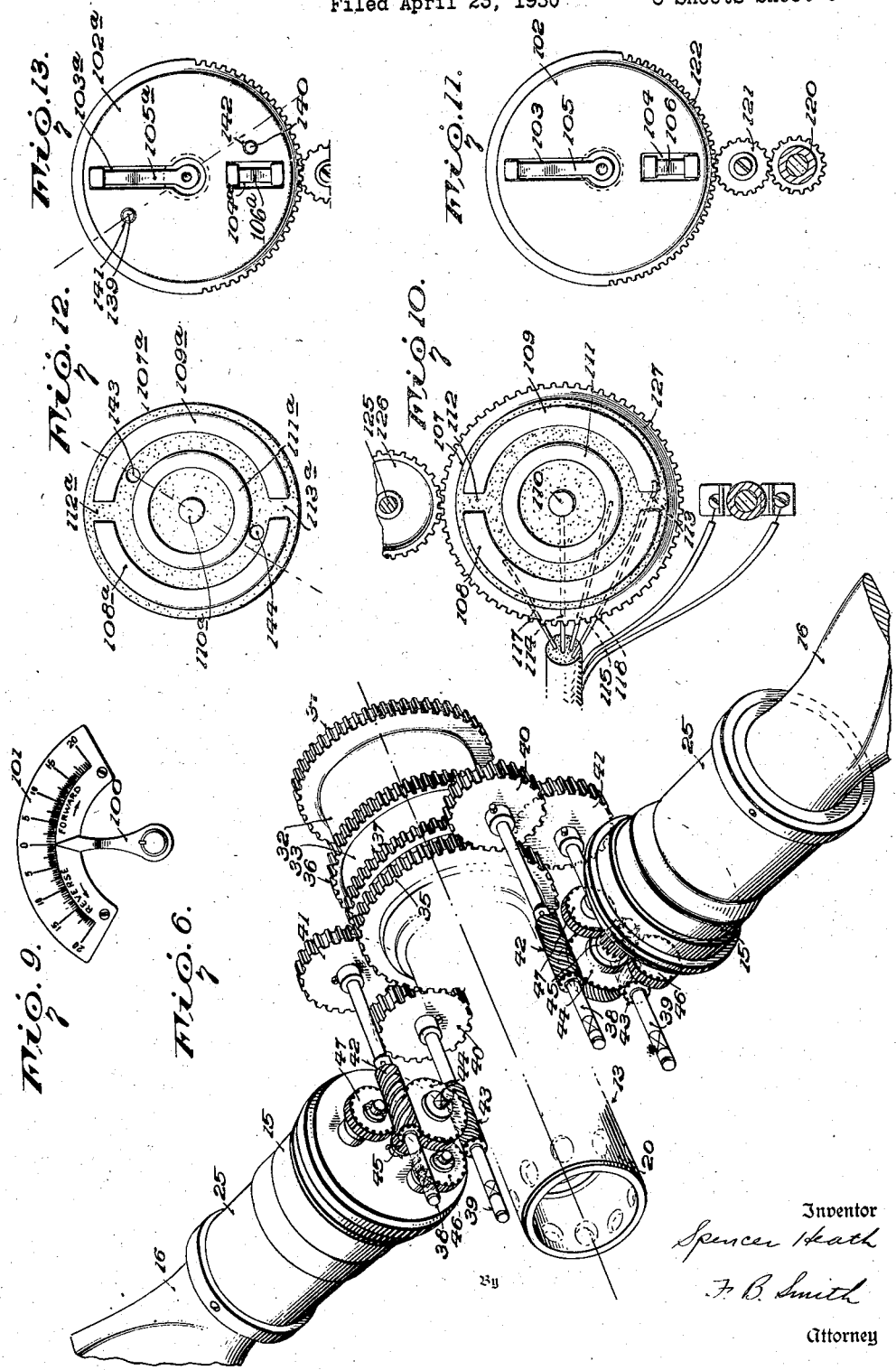

Patented Aug. 23, 1938

2,127,687

UNITED STATES PATENT OFFICE 2,127,687

PROPELLER

Spencer Heath, Elkridge, Md., assignor to The American Propeller Company, Baltimore, Md., a corporation of Maryland Application April 23, 1930, Serial No. 446,629

30 Claims. (Cl. 170—163)

This invention relates to propellers, and more particularly to propellers adapted for use on aircraft and provided with variable pitch blades.

It has heretofore been proposed to provide aircraft propellers having means under control of the operator for changing the angularity of the blades during flight and means to indicate to the operator the various angles assumed by the blades. However in the mechanisms heretofore devised, the indicating and pitch varying means have been simultaneously operable thus rendering it necessary for the operator to carefully watch the indicating means to the end that further operation of the pitch varying means might be discontinued when the pitch of the blades corresponded to that desired. This required careful and skillful operation on the part of the operator, it being necessary for the latter to devote his entire attention to this operation and in many instances due to the construction of the mechanism it was often impossible to disconnect the power from the pitch varying means at the proper instant when the pitch of the blades would correspond to that desired. It is accordingly one of the objects of the present invention to provide a novel controllable pitch propeller, so constructed as to avoid the above difficulties.

Another object of the invention is to provide in a variable pitch propeller, the angularity of the blades of which may be varied during operation thereof, novel means for securing such change in angularity.

A further object is to provide, in combination with a variable pitch propeller, novel means for automatically varying the pitch of the blades during operation and in accordance with the will of the operator.

Another object is to provide, in a propeller of the above character, novel means capable of being adjusted to a desired pitch setting, in combination with novel means for thereafter automatically changing the pitch of the propeller blades in accordance with the said pitch setting.

A further object is to provide a device of the above character embodying novel means for varying the pitch of the propeller blades during operation including manual power, power derived from the engine shaft which rotates the propeller, or power from an external source, any one of said power means being available for use during normal operation of the propeller.

A still further object is to provide means for changing the pitch of the blades of a rotating propeller comprising a novel arrangement of parts so constructed as to secure positive and efficient operation together with minimum weight, the parts being assembled in a novel manner in order to obtain a compact arrangement capable of ready adaptability to aircraft.

Other objects and features of novelty will appear more fully hereinafter from the following detailed description when taken in connection with the accompanying drawings. It is to be expressly understood, however, that the drawings are for purposes of illustration only and are not designed as a definition of the limits of the invention, reference being had for this purpose to the appended claims.

In the drawings, wherein like reference characters refer to like parts throughout the several views, Fig. 1 is a vertical section, with parts broken away, of a propeller embodying the present invention;

Fig. 2 is an end view of the mechanism illustrated in Fig. 1;

Fig. 3 is a perspective of one form of pitch varying means which may be employed, together with one type of power means for operating said pitch varying means;

Fig. 4 is a view similar to Fig. 1 but illustrating a modified form of the pitch changing mechanism located within the propeller hub;

Fig. 5 is a view partly in section of the external power means for operating said pitch varying means;

Fig. 6 is a perspective of the parts shown in Fig. 1 which are located within the propeller hub;

Fig. 7 and 8 are sectional views illustrating a form of centrifugal clutch which may be used with the mechanism shown in Fig. 5;

Figs. 9, 10 and 11 are detailed views of the indicating and control means which may be employed with the structure illustrated in Fig. 5;

Figs. 12, 13 and 14 are views illustrating a modified form of the indicating and control means shown in Fig. 5; and Fig. 15 is a sectional view of a modified form of connection wherein the motor is directly connected with the pitch-changing mechanism.

Referring more particularly to Figs. 1 and 2, a shaft 13 is drivably connected to the crankshaft of an internal combustion engine, a portion of the engine crankcase being shown at 14, and carries a split propeller hub 15 of suitable construction, the said hub carrying a plurality of blades 16 adapted to propel an aircraft when rotated by the hub and shaft. The hub 15 is drivably secured to the shaft 13 by cooperating splines 17, 18 and is maintained in proper relation thereon by means of an outer split cone 19 and lock nut 20, the latter being effective to force the inner bevelled face 21 of the hub into firm engagement with the outer bevelled face 22 of a sleeve 23 carried by the drive shaft.

As shown, the roots of blades 16 are provided with a split lagging 24 the inner end of which is threaded into a socket or ferrule 25, the outer peripheral portion of said lagging being secured to the socket by means of a plurality of set screws 26. In order to rotatably support the socket 25 within the hub, a suitable thrust bearing 27 is interposed between a collar 28, threaded within the hub, and a peripheral flange 29 formed on the inner end of the socket, the bevelled portion 30 of said flange cooperating with face 31 of the hub to constitute a bearing surface.

Means are provided to rotate the blades with respect to the hub in order to vary the pitch of said blades, and preferably said means are constituted in a manner to enable the pitch of the blades to be changed during operation of the propeller. In the form shown, a pair of sleeves 32 and 33, rotatable with respect to each other, are concentrically arranged with respect to the sleeve 23, the inner sleeve 32 being free to rotate on sleeve 23. Suitably secured to sleeve 32, at either end thereof are gears 34 and 35, a similar pair of gears 36 and 37 being attached to or formed integrally with the sleeve 33. A pair of shafts 38 and 39, Figs. 2 and 6, located in each end of the hub and rotatably supported therein in any suitable manner, carry on their inner ends exteriorly of the hub, gears 40 and 41 respectively, in mesh with each other and with gears 35 and 37. Each of the shafts 38 and 39 carries intermediate its ends and within the hub, a worm 42 and 43, between which there is located, a worm wheel 44, suitably journaled in the hub and in mesh with each worm. A sun pinion 45, which may be formed integrally with the worm wheel 44, is adapted to engage a pair of planetary gears 46 and 47, rotatably carried by stub shafts 48 and 49 that are fixedly mounted in the bottom of socket 25; the said planetary gears being also in engagement with an internal gear 50 fixed within the propeller hub.

Rotation of gears 40 and 41 will rotate the worm shafts 38 and 39, Fig. 6, in opposite directions thus causing rotation of the worm wheel 44 and sun pinion 45 in a direction determined by the direction of rotation of gears 40 and 41. The planetary gears 46 and 47 cooperate with the internal stationary gear 50 to impart a turning movement to the propeller blades through the hub 25 and lagging 24 to vary the angularity or pitch of the said blades. It is here pointed out that the pitch of the threads of each of the worms 42 and 43 is such that there will be no tendency of the shafts 38 and 39 to rotate by reason of any thrust or turning force applied to the propeller blades.

In Fig. 4, there is illustrated, an alternative form of the invention, which is similar to that shown in Fig. 1 in all respects except the planetary reduction gearing housed within the propeller hub. As shown, the planetary gears 46 and 47, in this form, are compounded, that is, each of these gears is formed integrally with a gear 51 and 52 of less diameter than gears 46 and 47 and which coact with the stationary internal gear 50. Such a compound planetary gear reduction may be employed to obtain a different gear ratio from that utilized in the structure illustrated in Fig. 1, without materially altering the arrangement of parts.

Normally, the sleeves 32 and 33 carrying gears 35 and 37, which are in constant engagement with gears 40 and 41, rotate with the driving shaft. In order to impart motion between these sleeves, each is provided with a brake drum 53, 54 adapted to be retarded by a brake band 55, 56, which bands may be selectively operated in any suitable manner, as for example by means of operating levers one of which is shown at 57, Fig. 2. It will be understood that operation of either of these brake operating levers will serve to retard one or the other of the sleeves 32 or 33 thereby causing rotation of gears 40 and 41 in the desired direction to increase, decrease or reverse the pitch of the propeller blades through the system of reduction gearing above set forth.

Means other than the brake bands 55 and 56, are provided for operating the pitch varying mechanism heretofore described, and preferably such other means are constructed in such a manner as to be operable not only when the propeller is rotating, but also when the propeller is stationary. To this end, a spider 58 which is rotatably supported by the sleeve 32, as by means of ball bearings 59, carries a pair of shafts 60 and 61, the ends of each of said shafts rotatably carrying planetary gears 62 and 63, Figs. 1 and 3. The gears 62 mesh with the gear 36 and also with an internal ring gear 64, while gears 63 mesh with the gear 34 and a similar internal ring gear 65. Each of these ring gears is rotatably supported with respect to a casing 66, fixed in any suitable manner as by means of screws 67 to the crank case 14, and carry external ring gears 68 and 69 which mesh with pinions 70 and 71 respectively. Each of these pinions preferably engages the other the teeth thereof being partially overlapped for this purpose, the said pinions being keyed to shafts 72 and 73, Figs. 2 and 3, which shafts are suitably journaled in the walls of the casing 66.

The shaft 73, as shown, is extended in order that manual or power means may be applied thereto in order to change the pitch of the propeller blades. Normally, the shaft 73 is at rest, whether the propeller is in operation or whether the same is idle. It will be seen that rotation of shaft 73 in either direction will rotate pinions 70 and 71 in opposite directions which will, in turn, drive the external ring gears 68 and 69 also in opposite directions. The planetary gears 62 and 63 will likewise rotate in opposite directions with respect to each other, through the oppositely rotating gears 64 and 65, to cause relative movement of sleeves 32 and 33 to thereby alter the pitch of the propeller blades, the change in pitch being directly proportional to the extent of movement of the normally stationary shaft 73.

Power means may be provided for rotating the normally stationary shaft 73 in order to change the pitch of the propeller blades in the manner indicated above. In the form shown, such means preferably comprises an electric motor 74, fixed to any suitable stationary portion of the aircraft and which may be provided with a hollow armature shaft 75 through which the extended shaft 73 extends, a bearing member 73ª being provided for rotatably supporting the said extended shaft adjacent its inner end. The armature shaft is normally disconnected from the shaft 73, a drivable connection therebetween being effected by means responsive to the speed of the motor.

As shown, Figs. 7 and 8, the speed-responsive means for connecting the motor shaft 75 and the pitch control shaft 73 may be embodied in a centrifugal clutch, the driven element of which may be drivably connected to shaft 73. The driving element is constituted by a hubbed flange 76 secured to the motor shaft 75 and carrying perforated segmental lugs 77 adapted to support clutch shoes 78. Each of these shoes is provided with a headed pin 79 passing through the perforation in each of the said lugs, and resiliently urged inwardly, as by means of springs 80 in order to maintain the clutch shoes 78 normally in retracted position. Upon rotation of shaft 75, the clutch shoes will, at a certain speed, be effective to frictionally grip the rim 81 of a driven element 82, suitably secured to the shaft 73. It is here pointed out that this centrifugally actuated clutch enables the motor to be brought up to speed substantially free of any load. In addition to this feature, the motor is normally disconnected from the shaft 73 thus relieving the said shaft of unnecessary load when it is desired to vary the pitch of the propeller blades by operation of the brake drums 53 and 54 as heretofore described.

However, in certain instances, it may be desirable to eliminate the clutch 78, 81, in which event the motor shaft 75 is directly connected to shaft 73 as illustrated in Fig. 15.

Instead of employing the electric motor for rotating the shaft 73, manual means may be provided, such means being also preferably normally disengaged from the said shaft. In the form of the invention illustrated, Fig. 5, the manual means comprises a shaft 83 suitably journaled in a panel 84 and bearing member 85, and carrying a gear 86 at its outer end normally disengaged with respect to, but movable into engagement with a gear 87 fixed to shaft 73. A hand crank 88 is connected to the inner end of the shaft 83 in order to manually turn the same. A spring 89 normally maintains the parts in the position shown in the drawings.

Means may be provided for controlling the operation of the electric motor and for indicating the pitch of the propeller blades as altered by said motor, and preferably such means is so constituted that the motor may be automatically disconnected from the pitch changing mechanism when the pitch of the blades has reached a value as predetermined by a prior adjustment of the indicating means. To this end, a hollow shaft 90, suitably supported in bearing member 91 and insulating panel 92, is suitably geared to shaft 73 in a manner such that a one-degree change in pitch of the propeller blades will preferably rotate the shaft 90 an angular distance of two degrees.

In order to drivably connect the shafts 73 and 90 in the manner indicated above, a combined bevel and spur gear 93 and a combined sprocket wheel and spur gear 94 are rotatably mounted on shaft 90 but drivably connected together through differential pinions 95 carried by a spider 96, the latter being secured to the said shaft by any suitable means. The members 93 and 94 are driven by a pinion 97 and sprocket 98 each of which is fixed on shaft 73. The ratios between the gear drive and sprocket drive are slightly different, hence members 93 and 94 will rotate at unequal speeds and impart a slow, differential motion to the shaft 90 through the pinions 95 and spider 96.

Remote from the propeller, and in convenient reach of the operator there may be provided a combined indicating and remote control member indicated generally at 99, suitably journaled in the panel 84 and carrying a pointer 100 adapted to cooperate with a scale 101 suitably graduated in degrees. The member 99 also carries, on the opposite side of the panel, an insulating disk 102 constituting a switch member which is provided with slots 103 and 104, Figs. 5 and 11, adapted to receive resilient contact strips 105 and 106 respectively. A second insulating disk 107, constituting a second switch member, is carried by the shaft 90, Figs. 5 and 10, and is provided with a pair of arcuate shaped terminal members 108 and 109, a central terminal 110 and a continuous circular terminal 111 arranged intermediate the arcuate and central terminals. These terminals are adapted to coact with the ends of the contact strips 105 and 106 to complete the electrical connections to the electric motor 74, a pair of gaps 112 and 113 being provided between terminals 108 and 109 to interrupt the electrical circuit at the proper time. It is here pointed out that the parts are so arranged that when the index pointer 100 points to zero on the scale 101, the contact strips 105 and 106 will be vertically aligned, and if the pitch of the propeller blades is zero, then the gaps 112 and 113 will register with the ends of said contact strips and there will be no current flow to the motor, the scale then indicating the true pitch of the blades.

The electric motor 74 is electrically connected with the switch member 107 and is connected in such a manner that the rotation of the motor may be reversed, if desired, whereby the pitch of the propeller blades may be reversed. A switch is preferably inserted in the energy supply circuit for the motor in order to facilitate the control of the pitch changing operation. As shown, terminals 114 and 115 of the motor are connected to terminals 110 and 111, Figs. 5 and 10, while a source of energy, such as for example, a battery 116 is connected by leads 117 and 118 to the contact members 108 and 109, a control switch 119 being interposed in series with lead 118. The switch 119, as shown, is also adapted to rotate the control member 99 through a train of gearing comprising a pinion 120, fixed to the shaft of the push switch, an idler pinion 121 and an external gear 122 fixed to the periphery of the control member 99, in order to set the said control member at a desired pitch setting. As shown, in Fig. 11, the external gear 122 is provided with teeth on only a portion of its periphery in order to provide suitable stop means for the indicator pointer 100.

When it is desired to vary the pitch of the propeller blades by means of the electric motor 74, the combined pitch setting and switch member 119 is rotated until the pointer 100 indicates the pitch or angularity that the blades are to automatically assume. Thereafter, it is only necessary to push the switch member 119 inwardly in order to complete the circuit connection 118 and the blades will automatically rotate about their own axes until the pitch thereof corresponds to that indicated on dial 101. As soon as this pitch has been assumed by the blades, the energy supply to the motor will be interrupted and the pitch changing mechanism will come to rest.

Referring more particularly to Figs. 5 and 11, when the circuit connection 118 is completed by closure of switch 119, there will be completed an electrical circuit from battery 116, lead 117 to the terminal 108 through the contact strip 103 to the central terminal 110, motor terminals 114 and 115 to circular contact member 111, contact strip 106, terminal 109 and back to the battery by return lead 118 and closed switch 119. Substantially simultaneously with the closing of the last named switch and completion of the electrical circuit above outlined, the rotation of the motor 74 will establish by means of the centrifugal clutch, a driving connection between the armature shaft 75 and the normally stationary shaft 73 whereby the latter will be rotated, and through the pitch changing mechanism heretofore described, including gears 70 and 71, Fig. 5, the angularity of the blades will be altered.

As shaft 73 rotates, the switch member 107 carried by shaft 90 will also rotate an angular distance proportional to the change in pitch, as heretofore described, until the gaps 112 and 113, Fig. 10, rotate to such a position as to receive the outer extremities of contact strips 105 and 106, whereby the current supply to the motor will be interrupted thus immediately decreasing the speed of the motor to cause the centrifugal clutch elements 78, Fig. 7, to become inoperative and to interrupt the driving connection between shafts 73 and 75. The angularity of the propeller blades will then correspond to the initial setting of the control member 99 with its indicator 100 and associated dial 101.

If it is desired to reverse the pitch of the propeller by the electrical means, the combined pitch setting and control member 119 is turned in the opposite direction to the desired reverse pitch setting, as indicated on the scale 100, and then depressed to complete the circuit through lead 118. The contact strip 105 now connects contacts 109 and 110 while strip 106 bridges terminals 108 and 111 and it will thus be seen that the direction of current through the motor will be reversed. As before, the pitch of the blades will be altered to that indicated by pointer 100, and further change will be automatically arrested because of the interruption of the motor circuit by reason of the registry of slots or gaps 112 and 113 with the contact strips 105 and 106.

In order to prevent racing of the engine which drives the propeller when the blades of the latter are at or near their zero pitch condition, a cam 128 secured to shaft 90, Figs. 3 and 5, operates a pivoted lever 129 and a linkage 130 connected to a throttle control rod 131 in such a manner, that movement of the throttle rod is limited by the position of the cam. The said cam is initially set in such a position that it limits the opening of the engine throttle only when the propeller blades are at very low pitch and permits least opening when they are at zero pitch.

In order to indicate the pitch of the blades at all times to the operator, whether the pitch has been changed by operation of the brake band mechanism or the manual means heretofore described, there is provided a second pointer 123, Fig. 5, adapted to cooperate with a scale 124 the said pointer being carried by a shaft 125 drivably connected with the shaft 90 through gears 126 and 127, the latter being carried by the rim of the switch member 107.

Figs. 12, 13 and 14 illustrate a modified form of the remote control member wherein the parts are so constructed that the indicating member may be employed to indicate the pitch of the blades to the operator at all times, irrespective of whether the electric motor, brake band mechanism or manual means are utilized to vary the pitch of the blades. As shown, Fig. 14, a control member 99ª is provided with a hollow shaft 135 suitably journaled in panel 84, and is adapted to receive a rod 136 on the inner end of which is pivoted a control stop 137. The opposite end of the rod is secured to a forked member 138 having end portions 139 and 140 housed in apertures 141 and 142 in disk 102ª, Fig. 13. These end portions are operable to engage respectively recesses 143 and 144 formed in disk 107ª, these recesses and the end portions of member 138 being positioned slightly off-center, Figs. 12 and 13, so that the disks 102ª and 107ª may be clutched together in one position only.

Normally, the parts are maintained in the position shown in Fig. 14 by means of the pivoted stop 137 engaging the inner end of the shaft 135. In this position, a spring 145 is compressed between the member 138 and an interior portion of the shaft 135. It will be seen that with the parts thus arranged, the control member 99ª may be operated to automatically control the electric motor 74 as heretofore described. However, if it is desired to employ the brake band mechanism or the manual means for changing the pitch of the blades, it is only necessary to move the outer extremity of the stop downwardly whereby the spring 145 will be effective to move the member 138 to the left as viewed in Fig. 14. If the end portions 139 and 140 do not register with the recesses 143 and 144, the disk 102ª may be rotated by rotation of pinion 120 until such registry occurs whereby disks 102ª and 107ª will be locked together and all movements of shaft 90 will be indicated on dial 101.

When it is desired to change the pitch of the blades by means other than the electric motor 74, either the brake band 55 or 56 may be operated by suitable means to cause relative rotation between sleeves 32 and 33 while the propeller is rotating, as heretofore described, or the manual means including the crank 88 may be operated, either when the propeller is rotating or when idle. In either case, the shaft 73 will be rotated an amount proportional to the change in pitch, which may be indicated in the manner described above.

It will be noted that if the combined pitch setting and control member 119 be first depressed before rotation of the pointer to a new pitch setting, if the outer extremities of strips 105 and 106 occupy the gaps 112 and 113, the circuit to the motor will be incomplete and the latter will not start. As soon, however, as the member 119 is turned in either direction, an electrical circuit through the motor will be established, as heretofore described, and the rotation of the motor will cause the openings 112 and 113 to follow every change in position of the strips 105 and 106. That is, the pitch of the propeller blades will follow every movement imparted to the pointer 100.

There is thus provided by the present invention a variable pitch propeller having novel means for securing the angular adjustment of the blades thereof during operation, such means including manual means, electrical means, or means operable by power derived from the engine shaft, any one of said means being adapted to selectively vary the propeller pitch through a train of suitable gearing. The arrangement of the reduction gearing within the propeller hub and the location of the actuating mechanism externally of said hub is such that the mechanism may be readily adapted to existing types of aviation engines where compactness and economy in space is a prime requisite. By employing the novel indicating and control means for predetermining the effective operation of the electrical means for varying the propeller pitch, an automatic operation is secured, which is not only positive and efficient in operation but is also operable in a simple manner requiring a minimum of the operator's time in its manipulation.

While reference has been made in certain instances that the propeller is particularly adapted for use on aircraft, it is to be understood that the application of the invention is not limited to such use but may be employed wherever it is desired to propel a vessel through a fluid medium.

Though there has been illustrated and described only one embodiment of the invention, it is to be understood that the same is not limited to the form shown but may be embodied in various forms. For example, the electrical means for varying the pitch of the blades may be omitted and suitable mechanical means such as a cam may be employed, constituting a control member selectively operable to a predetermined position and coacting with the brake-band-operated pitch changing mechanism for releasing the brake bands when the pitch of the blades corresponds with the setting of said cam control member. The speed responsive clutch for drivably connecting the motor with the pitch changing mechanism may moreover be omitted and the motor directly connected to said mechanism, if desired. While the indicating members 100 and 123, Fig. 5, have been illustrated as being spaced apart and provided with separate dials, the same could be concentrically arranged, if desired, by employing suitable gearing, whereby both indicating means may cooperate with the same scale and a compact and efficient arrangement obtained.

It is also to be understood that various other changes may be made in the construction and arrangement of the component parts constituting the invention without departing from the spirit thereof. Reference will therefore be had to the appended claims for a definition of the limits of the invention.

What is claimed is:

1. In a controllable pitch propeller having a plurality of blades, a normally stationary control member manually movable only, said member being movable to a desired pitch setting while the propeller is rotating, means for varying the pitch of said rotating blades, said means including mechanism for initiating operation of said pitch varying means after setting movement of said control member is completed, and means for rendering inoperative said pitch varying means when the pitch of said blades corresponds with the setting of said control member.

2. A controllable pitch propeller comprising a hub, driving means for said hub, a plurality of blades carried by said hub, means including an electric motor for changing the pitch of said blades while the propeller is being driven, a control member movable to any desired pitch setting, means for thereafter energizing said motor, and means coacting with said control member for automatically arresting movement of said pitch-changing means when the pitch of said blades corresponds with the position of said control member.

3. A controllable pitch propeller comprising a hub, means for rotating said hub, a plurality of blades carried by said hub, a control member manually movable only, said member being movable to any desired position during rotation of the propeller and means operable at the will of the operator for thereafter automatically changing the pitch of said propeller blades in accordance with the setting of said control member.

4. A variable pitch propeller having a hub, means for rotating said hub, a plurality of blades carried by said hub, means including an electric motor for changing the pitch of said blades during rotation, and combined indicating and control means for said motor movable to indicate the desired pitch, separate means for thereafter rendering said motor operable, and means for automatically rendering said motor inoperative when the pitch of said blades corresponds to that indicated by the combined indicating and control means.

5. A controllable pitch propeller comprising a hub, means for rotating said hub, a plurality of blades carried by said hub, a control member movable to any desired position during rotation of the propeller and electric power means including a second control member for thereafter automatically varying the pitch of said rotating blades in accordance with the setting of said first named control member, said last named means being deenergized when the pitch of the blades corresponds to the setting of the first named control member 6. In a controllable pitch propeller, having a plurality of blades, a control member manually movable only, said member being movable to a desired pitch setting while the propeller is rotating, and means for thereafter varying the pitch of said rotating blades at will, said means including a member coacting with said control member for automatically discontinuing the operation of said pitch varying means when the pitch of said blades corresponds with the setting of said control member.

7. In a controllable pitch propeller having a plurality of blades, a control member movable to a desired pitch setting while the propeller is rotating, means for thereafter varying the pitch of said rotating blades at will without moving said control member, and means for rendering said first named means inoperative when the pitch of said blades corresponds with the setting of said control member.

8. A variable pitch propeller having in combination, a hub, means for rotating said hub, a plurality of blades carried by said hub, mechanism for changing the pitch of said blades while the propeller is rotating including a normally stationary shaft, an electric motor normally disconnected from said shaft, means for energizing said electric motor, and speed responsive means for drivably connecting said electric motor and said stationary shaft to thereby change the pitch of said blades.

9. A controllable pitch propeller comprising a hub, means for rotating said hub, a plurality of blades connected with said hub, means for varying the pitch of said blades while the propeller is rotating including a normally stationary shaft, an electric motor normally disconnected from said shaft, means including a control member movable to a desired pitch setting for energizing said motor, means for connecting said motor to said stationary shaft, and means for automatically deenergizing said motor when the pitch of said blades corresponds with the setting of said control member.

10. In a controllable pitch propeller the pitch of the blades of which is variable during operation of the propeller, means including gearing, operable to vary the pitch of said blades, an electric motor normally disconnected from said pitch varying means, means for energizing said motor, centrifugally actuated means for drivably connecting said motor and said pitch varying means, and means for deenergizing said motor.

11. A variable pitch propeller comprising in combination a plurality of rotatable blades, means including reduction gearing for varying the pitch of said blades during rotation thereof, an electric motor for actuating said pitch varying means and means drivably connected to said motor for automatically disconnecting said motor from said pitch varying means.

12. In a variable pitch propeller having a plurality of blades, means operable to vary the pitch of said blades during rotation of the propeller, an electric motor for actuating said pitch varying means, means for deenergizing said motor when the pitch of said blades has reached a desired degree, and means for automatically disconnecting said motor from said pitch varying means upon deenergization of said motor.

13. In combination, a propeller having a plurality of blades, means including an electric motor for varying the pitch of said propeller blades during the rotation thereof, means for energizing said motor, means actuated by rotation of said first named means for deenergizing said motor, said actuated means including a pre-set control member, and means for automatically disconnecting said motor and first named means when the motor has been deenergized.

14. The combination with a propeller having a blade, means including a normally stationary shaft for changing the pitch of said blade during operation of the propeller, an electric motor for actuating said shaft, speed responsive means for connecting and disconnecting said motor and shaft, a control member for predetermining the extent of movement of said first named means and means for drivably connecting said shaft and control member.

15. In a variable pitch propeller having a plurality of blades, a combined switch and indicating member movable to a desired pitch setting while the propeller is rotating, and electrical means for thereafter varying the pitch of said blades at will, said means including a switch member coacting with said combined switch and indicating member for automatically discontinuing the operation of said pitch varying means when the pitch of said blades corresponds with the setting of said control member.

16. In a variable pitch propeller the pitch of the blades of which is variable during operation thereof, means including reduction gearing operable to change the pitch of said blades, an electric motor normally disconnected from said pitch changing means, means for energizing said motor, means responsive to the speed of the motor for drivably connecting said motor and said first named means, and means operated by said motor for automatically deenergizing said motor.

17. In combination, a propeller having a plurality of blades, means including an electric motor for varying the pitch of said blades while the propeller is rotating, means including a pair of relatively movable coacting switch members for energizing said motor, one of said switch members being drivably connected to said motor and operable to automatically deenergize said motor.

18. In combination, a propeller having a plurality of blades, means including an electric motor for varying the pitch of said blades, a combined switch and indicating member movable to a desired pitch setting while the propeller is rotating, means for thereafter energizing said motor including a second switch member drivably connected with said motor and coacting with said first named switch member, said switch members being so constituted as to deenergize said motor when the pitch of the blades corresponds to the setting of the combined member.

19. In combination, a propeller having a plurality of blades, mechanism including a normally stationary shaft operable to vary the pitch of said blades while the propeller is rotating, an electric motor normally disconnected from said shaft, means for energizing said motor, means for drivably connecting said motor and shaft and means drivably connected with said shaft for indicating the pitch of said blades.

20. In a variable pitch propeller having a plurality of blades, means including a normally stationary shaft operable to vary the pitch of said blades, an electric motor normally disconnected from said shaft, but adapted when energized to clutch said shaft, means for energizing said motor, means for indicating the pitch of said blades, and means including a differential mechanism for drivably connecting said shaft and indicating means.

21. In a variable pitch propeller having a plurality of blades rotatable about their axes to vary the pitch, means for so rotating said blades said means including an electric motor, an indicating device movable to a desired pitch setting said device carrying a plurality of contact members, a terminal switch member coacting with the contact members of said indicating device, a source of electrical energy, a switch adapted to connect said motor and source of energy after movement of said indicating device, and means for drivably connecting said motor and said terminal switch member.

22. In a variable pitch propeller having a plurality of blades the pitch of which may be varied during operation of the propeller, means including an electric motor for varying the pitch of said blades said motor being normally deenergized, means including a pair of relatively movable coacting switch elements for energizing said motor one of said elements being movable to a desired pitch setting, means for drivably connecting the other of said elements to said motor said switch elements cooperating to automatically deenergize said motor when the pitch of the blades corresponds with the desired setting.

23. A variable pitch propeller comprising a hub, a shaft for rotating said hub, a plurality of blades rotatably carried by said hub, means for rotating said blades in said hub to vary the pitch said means comprising a pair of spaced worm shafts within said hub, a worm wheel positioned between said worm shafts and cooperating therewith, a sun gear carried by said worm wheel, a plurality of planetary gears meshing with said sun gear and carried by said blade, a stationary internal gear cooperating with said planetary gears and means for rotating said worm shafts while the propeller is rotating to operate said planetary gears to vary the pitch.

24. A variable pitch propeller comprising a hub, a shaft for rotating said hub, a blade rotatably carried by said hub, means for rotating said blade in said hub while the propeller is rotating comprising a pair of worm shafts within the hub, means including a plurality of planetary gears for drivably connecting said blade and worm shafts, a gear carried by each of said worm shafts externally of said hub and meshing with each other and means to impart rotation to either of said gears to increase or decrease the pitch of said blade.

25. In a variable pitch propeller, a hub, a propeller blade mounted in said hub, means operable for changing the pitch of the blade in either direction while the propeller is in operation, a single clutch in said first named means, and means operable to disengage said clutch after the pitch of the blades has reached a predetermined limit in either direction.

26. In a variable pitch propeller, a hub, a propeller blade mounted in said hub, power operated means for changing the pitch of the blade in either direction while the propeller is in operation, a single rotatable power driven clutch in said first named means, and means operable to disengage said clutch after the pitch of the blades has reached a predetermined limit in either direction.

27. In a variable pitch propeller, a hub, a propeller blade rotatably mounted in said hub, power-operated pitch changing mechanism for rotating said blade in the hub to vary the pitch while the propeller is in operation, a single clutch in the pitch changing mechanism normally engaged during the pitch changing operation to transmit power to the blades to vary the pitch thereof in either direction, and means operable after the pitch of the blades has reached a predetermined limit for disengaging said clutch.

28. The combination with an airplane driving shaft, of a propeller hub driven thereby, a set of blades carried by said hub and arranged to rotate about their longitudinal axes, means including a manual control for rotating said blades about their longitudinal axes, a reversible motor geared to said control, means for operating said motor to actuate said control, an indicator actuated by said control, and means controlled by said indicator for stopping said motor.

29. The combination with an airplane driving shaft, of a propeller hub driven thereby, a set of blades carried by said hub and arranged to rotate about their longitudinal axes, means including a manual control for rotating said blades about their longitudinal axes, a reversible motor connected to said control, means for operating said motor to actuate said control, an indicator actuated by said control, and means controlled by said indicator for stopping said motor.

30. In a controllable pitch propeller having a plurality of blades, a pitch control member, pitch-changing means, a single means operable in one direction for moving said member to a desired pitch setting and operable in another direction for initiating operation of said pitch-changing means, and means for rendering inoperative said pitch-changing means when the pitch of said blades corresponds with the setting of said control member.

SPENCER HEATH.